Sept. 3, 1968          E. S. LUNDGREN          3,399,668
DISPOSABLE CHOLANGIOGRAPHY CATHETER
Filed Feb. 28, 1966

INVENTOR.
EDWARD S. LUNDGREN
Kimmel, Crowell & Weaver
ATTORNEYS.

United States Patent Office 3,399,668
Patented Sept. 3, 1968

3,399,668
DISPOSABLE CHOLANGIOGRAPHY
CATHETER
Edward S. Lundgren, 85 Sierra Vista Drive,
Tucson, Ariz. 85719
Filed Feb. 28, 1966, Ser. No. 530,691
1 Claim. (Cl. 128—2)

ABSTRACT OF THE DISCLOSURE

A surgical instrument for use in open obdominal surgery and comprising an elongated length of flexible transparent plastic conduit having opposed open ends, the conduit having a blunted or rounded end edge at one end thereof and a smooth outer surface immediately adjacent thereto to facilitate its entry into a body passage, linear scale indicia extending axially from the other end of the conduit inwardly to a point adjacent to but spaced from said smooth portion, friction means on the exterior side of the conduit extending axially thereof between the adjacent inner ends of the indicia means and said smooth portion of the conduit, and means connected with the other end of the conduit for introducing a fluid under pressure therein.

---

This invention relates to catheters, and more particularly for catheters of the type used in operative cholangiography.

As conducive to an understanding of the instant invention, it should be noted that operative cholangiography is a procedure for taking X-rays of the common bile duct in the biliary tract at the time of surgery. This can be accomplished by injecting a radiopaque solution directly into the common bile duct or by injecting such a solution through the cystic duct into the common bile duct. Although many methods have been devised for using cholangiographic techniques, all known procedures are defective in some respects.

In the conduct of gallbladder surgery, surgeons are usually on the lookout for gallstones in the bladder, and must also be on the lookout for pathology in the common bile duct, such as gallstones, strictures of the duct, tumors and the like. The presence of pathology in the common bile duct may be diagnosed before surgery by any number of techniques known in the profession. If preoperative diagnostic techniques are not employed or if the results therefrom are ambiguous, the common bile duct should be explored or X-rayed while the abdominal cavity is open.

Initially, the technique was to inject a radiopaque solution into the common bile duct by using a suitable needle and syringe. The next development in this area was to make an incision in the cystic duct and insert a piece of slick flexible tubing therethrough. The tubing was then tied in place by a piece of surgical thread wrapped about the cystic duct after which the radiopaque solution was injected into the common bile duct. The most apparent disadvantage in this procedure was that the tubing frequently sliped out of the bile duct since it is inherently somewhat slippery.

The next development in operative cholangiography was the use of an ureteral catheter which may be inserted through an incision into the cystic duct. The remaining techniques were substantially the same as when utilizing ordinary tubing. The disadvantages of the ureteral catheters, in addition to being somewhat susceptible to dislodgement, is that they are opaque. Since these catheters are opaque, it is impossible to see if there are any air bubbles mixed with the radiopaque solution in the catheter. If air bubbles are injected into the common duct, they may give the appearance of gallstones on the X-ray film.

Although the cholangiography procedures were described many years ago, the profession has been reluctant to use the technique routinely. This has been attributed to the fact that the procedure can be troublesome and time-consuming as well as the absence of mechanical aids that are particularly adapted for such use. The cholangiography catheter of the instant invention is designed to simplify this procedure with the hope that the profession may be stimulated to use and perfect this worthwhile technique.

It is an object of the instant invention to provide a transparent non-radiopaque cholangiography catheter which is provided with means for facilitating the securement of the catheter in a body passageway such as the cystic duct.

Another object of the instant invention is to provide a method of utilizing a transparent non-radiopaque catheter in operative cholangiography.

Still another object of the instant invention is to provide a transparent non-radiopaque catheter conduit in which the friction increasing means includes an adhesive material provided on the exterior of the conduit adjacent but spaced from the end to be inserted in the cystic duct.

A further object of the instant invention is to provide a transparent radio non-opaque catheter conduit in which the friction increasing means includes a plurality of ridges and depressions of no greater diameter than the catheter spaced adjacent the end of the conduit to be inserted in the body passageway.

A still further object of the instant invention is to provide a transparent radio non-opaque chloangiography catheter having a plurality of spaced indicia along the conduit between the friction increasing means and the means for injecting a radiopaque solution therein for determining the extent of insertion of the conduit into the cystic duct.

A more specific object of the instant invention is to provide an adaptor inserted into the other end of the catheter conduit having a female connection arranged to receive a conventional syringe.

Another object of the instant invention is to provide a transparent radio non-opaque cholangiography catheter in which the insertible conduit end is blunt and beveled to facilitate passing the conduit through the cystic duct.

Still another object of the instant invention is to provide a cholangiography catheter which is stored in a sterile package with the catheter being disposable after use.

It is an object of the instant invention to provide a one unit assembly of a transparent non-radiopaque cholangiography catheter which will be filled with a radiopaque solution packaged in a sterile container, and available for immediate surgical use.

Other objects and advantages of the instant invention reside in the combinations of elements, arrangements of parts, and features of construction and utilization, all of which will be more fully pointed out hereinafter and disclosed in the accompanying drawing wherein there are shown preferred embodiments of this inventive concept.

Figure 1:
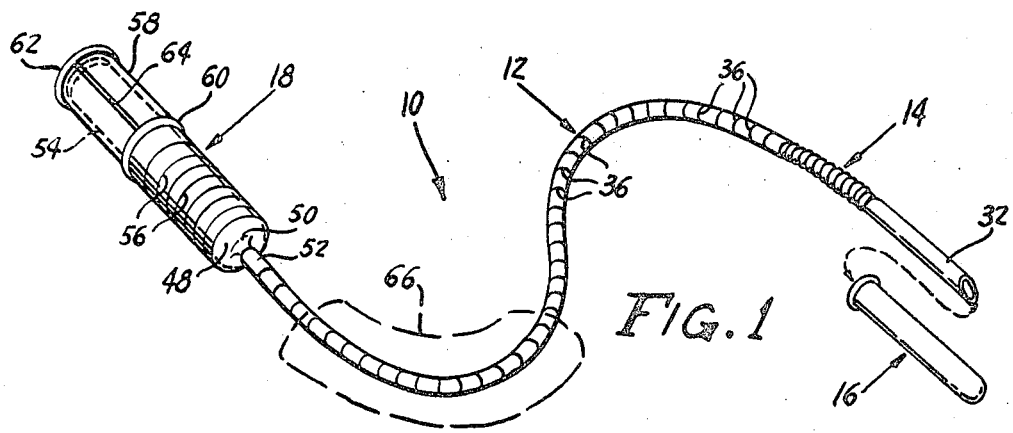
FIGURE 1 is an overall organizational view of the cholangiography catheter of the instant invention illustrating the transparent radio non-opaque conduit having a cap for closing the insertible end and a removable syringe attached at the other end.

Referring now to the drawing in detail, wherein like reference characters designate like elements throughout the several views thereof, there is shown generally at 10 a cholangiography catheter of the instant invention having as its major components a conduit shown generally at 12 having friction forming means designated generally at 14 adjacent the insertible end thereof, a removable closure shown generally at 16 for closing the insertible end of the conduit and a radiopaque material injecting means shown generally at 18.

Figure 2:
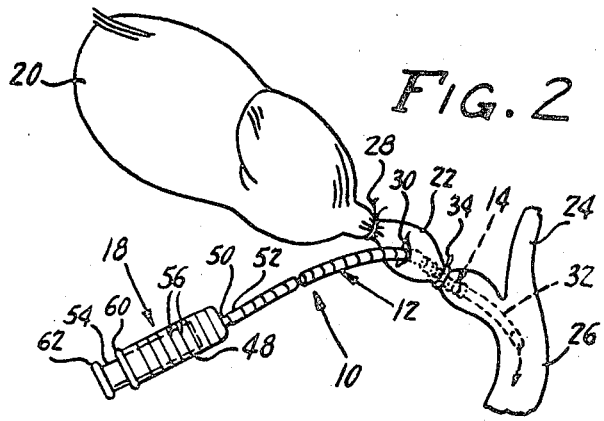
FIGURE 2 is a view of the cholangiography catheter in use, the conduit being inserted through an incision in the cystic duct and tied thereto by a securing element.

As may be seen best in FIGURE 2, catheter 10 of the instant invention will be utilized after the abdominal wall of the patient has been opened in order to expose gallbladder 20, cystic duct 22, hepatic duct 24 as well as common bile duct 26 which is formed by the junction of cystic duct 22 and hepatic duct 24. Cystic duct 22 will then be tied off in a conventional manner adjacent the junction of cystic duct 22 and gallbladder 20 by a suitable tying element 28 with an incision 30 then being formed immediately below the tie-off.

The insertible end 32 of catheter 10 will then be passed through incision 30 such that the forward end thereof is positioned at the junction of cystic duct 22 and hepatic duct 24. Catheter 10 will then be temporarily joined to cystic duct 22 by tying duct 22 thereto by a tying element 34 which presses the inside of cystic duct 22 against friction increasing means 14 to prevent movement of catheter 10. Injecting means 18 is then operated in a conventional manner to deliver the radiopaque solution to common bile duct 26 after which suitable X-rays may be taken to disclose the presence of pathology therein, such as gallstones, strictures of the duct, tumors or the like. It will be apparent that a rapid development of the X-ray films will provide the surgeon with a rapid, accurate and convenient means of determining abnormalities in the common duct.

Referring back to FIGURE 1, conduit 12 is made of a transparent non-radiopaque material, by which is meant that conduit 12 will not absorb sufficient X-ray radiation to prevent the X-ray film from being exposed along the trace of conduit 12, such as polyethylene, polystyrene, rubber or the like. In order to facilitate ready insertion of conduit 12 through cystic duct 22, conduit 12 is tubular in configuration with the exterior surface thereof being smooth except for the provision of friction increasing means 14. The terminus of insertible end 32 is preferably beveled at an acute angle to facilitate further the insertion and passage of conduit 12 through cystic duct 22 but is otherwise blunt to avoid injuring the internal walls thereof.

Conduit 12 is provided with a plurality of substantially equally spaced indicia 36 between friction increasing means 14 and injecting means 18 such that the surgeon may accurately determine the extent of insertion of conduit 12 in duct 22. This has been shown to be of considerable importance since conduit 12 is radio non-opaque. The use or radiopaque prior art catheters has allowed the use of X-ray film to determine the extent of insertion of the conduit which, of course, is no longer practicable with the catheter of the instant invention.

Figure 3:
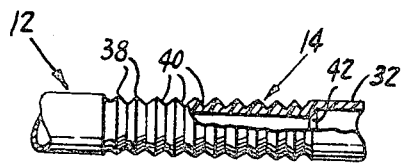
FIGURE 3 is an enlarged view, partly in section, of one form of the friction increasing means adjacent the insertible end of the catheter.

As may be seen in FIGURE 1, friction increasing means 14 is positioned adjacent but spaced from the terminus of insertible end 32 and preferably begins about four or five centimeters therefrom. As may be seen in FIGURE 3, one form of friction increasing means 14 is illustrated as a plurality of circumferentially extending ridges 38 and depressions 40 which act to increase the frictional engagement between the inside of cystic duct 22 and frictional increasing means 14 when tying element 34 is used to fasten conduit 12 interiorly of cystic duct 22. It should be apparent that ridges 38 and depressions 40 may extend obliquely with respect to conduit 12 or that an obliquely extending strip of plastic material may be provided in lieu thereof. It should be noted that the external diameter of friction increasing means 14 is not substantially increased beyond the diameter of conduit 12 by the use of ridges 38 and depressions 40 because of the provision of an internal offset 42 which provides sufficient thickness for the formation thereof.

Figure 4:
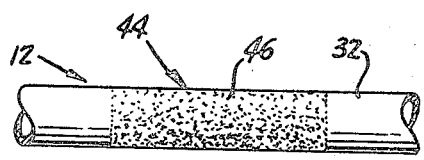
FIGURE 4 is a view of another embodiment of the friction increasing means spaced adjacent the insertible end of the catheter conduit.

Referring now to FIGURE 4, there is shown generally at 44 another form of friction increasing means on conduit 12. Friction increasing means 44 includes an adherent layer 46 of minimal thickness so as not to increase substantially the external diameter of conduit 12. Layer 46 may be formed in any suitable manner including abrading conduit 12 to form a roughened area, providing a non-toxic, water insoluble adhesive layer on conduit 12 on which fine grains of sand are permanently affixed, placing a non-toxic, water insoluble permanently tacky adhesive layer on conduit 12 or placing a non-toxic, water insoluble adhesive on conduit 12 which dries with a fine granular surface. Adherent layer 46 is such that a very light securement is provided with the interior wall of cystic duct 22 so that easy retraction of conduit 12 is practicable.

Referring now to FIGURES 1 and 2, injecting means 18 includes a syringe housing 48 forming a small restricted outlet 50 inserted into and connected in the receiving end 52 of conduit 12 with a syringe plunger 54 being slidably mounted in housing 48 in a conventional manner. A plurality of graduated indicia 56 are formed about the outer periphery of housing 48 to measure the quantity of radiopaque solution injected into the common duct of the patient.

An important feature of the instant invention lies in the packaging of cholangiography catheter 10 in a sterile package with syringe housing 48 and conduit 12 being filled with a suitable radiopaque solution, such as diodrast or any other conventionally used material. Since catheter 10 will be filled with a radiopaque solution and shipped and handled in such a condition, it is necessary to prevent the loss of such solution either by drainage through insertible end 32 or by inadvertently depressing plunger 54.

Accordingly, a releasable plunger retainer 58 is provided to preclude the depression of plunger 54 into syringe housing 48. Plunger retainer 58 rests against an enlarged circumferential flange 60 on housing 48 and against an enlarged flange 62 on syringe plunger 54 to accurately space flanges 60, 62 apart. Retainer 58 is preferably formed with a longitudinal groove 64 extending throughout the length thereof such that an individual may expand retainer 58 by placing a simple tool in groove 64. As previously mentioned, closure 16 seals insertible end 32 and prevents the loss of radiopaque material from conduit 12.

Catheter 10 will be encapsulated by a sterile plastic package 66 for immediate use during a gallbladder operation when the surgeon decides that operative cholangiography is necessary to diagnose pathology in the common bile duct. Package 66 may be removed along with closure 16 and plunger retainer 58 allowing catheter 10 to be used almost immediately after the decision is made. It will be readily apparent that the provision of such a catheter will overcome a substantial time-consuming factor that now tends to inhibit the use of operative cholangiography.

Figure 5:
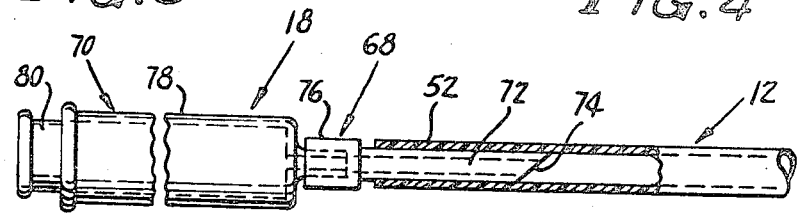
FIGURE 5 is an enlarged view, partly in section, of the connection between the receiving end of the conduit and a syringe and adapter placed therein for injecting a radiopaque solution through the conduit into the common bile duct.

Referring now to FIGURE 5, injecting means 18 may be provided with a syringe adaptor shown generally at 68 inserted into the receiving end 52 of conduit 12 with adaptor 68 accommodating a conventional syringe shown generally at 70. Adaptor 68 includes a conduit 72 having a beveled blunt end 74 inserted into receiving end 52 which is expanded by the placement of conduit 72 therein making a sealed connection therewith. Extending beyond the terminus of receiving end 52 and integral with conduit 72 is a female connection 76 constituting the other component of adaptor 48. Syringe 70 includes a housing 78, similar to housing 48, inserted into female connection 76 with a plunger 80 slidably mounted therein. In the event that syringe 70 contains less than the required amount of radiopaque solution, conduit 12 may be servered and a loaded syringe inserted into the cut end thereof.

It is now seen that there is herein provided an improved operative cholangiography catheter which accomplishes all of the objects and advantages of the instant invention and others, including many advantages of great practical ultility and commercial importance.

Since many embodiments may be made of the instant inventive concept, and since many modifications may be made of the embodiments previously mentioned, it is to be understood that the foregoing is to be interpreted merely as illustrative and not in a limiting sense.

I claim:

1. A catheter for use in operative cholangiography by insertion in the systic duct, said catheter comprising:

an elongated substantially hollow cylindrical tubular flexible conduit having an axially extending bore defined by an annuar wall, said conduit having a pair of opposed open ends, said conduit being formed of a transparent non-radiopaque polystyrene material, said conduit having sufficient rigidity to withstand, without deformation, external pressures exerted thereon by the wall of said duct;

said conduit having a substantially smooth external surface extending over a portion thereof immediately adjacent one of its ends;

said one end of said conduit terminating in a blunt edge disposed in a plane extending at an acute angle relative to the longitudinal axis of said conduit;

linear scale indicia means extending axially inwardly from the other end of said conduit, said indicia means terminating inwardly of said conduit at a point adjacent to but spaced inwardly from the inner end of said smooth portion;

said conduit having a substantially constant and uniform bore extending throughout the length thereof excepting that intermediate portion of said conduit which extends between said indicia means and said smooth portion wherein the bore is of reduced uniform diameter throughout the length of said intermediate portion;

said annular wall over said intermediate portion of said conduit being provided with a plurality of axially spaced alternating annular ridges and grooves with the outer diameters of said ridges being substantially equal to the outside diameter of said annular wall to provide friction means to prevent inadvertent movement of said conduit relative to said duct after insertion therein; and means on the other end of sad conduit for receiving a liquid pressuring device for injecting a radiopaque material through said conduit into said duct.

References Cited

UNITED STATES PATENTS

| | | | |
|---|---|---|---|
| 1,888,349 | 11/1932 | Jacoby | 128—349 |
| 2,531,667 | 11/1950 | Brent | 128—214.4 |
| 2,627,270 | 2/1953 | Glass | 128—218 |
| 3,017,884 | 1/1962 | Doherty et al. | 128—214.4 |
| 3,055,361 | 9/1962 | Ballard | 128—214.4 |
| 3,128,769 | 4/1964 | Scislowicz | 128—348 |
| 3,136,316 | 6/1964 | Beall | 128—350 |
| 3,154,080 | 10/1964 | Rowan et al. | 128—349 |
| 3,168,092 | 2/1965 | Silverman | 128—1.2 |
| 3,313,291 | 4/1967 | Marshall | 128—218 |
| 3,335,724 | 8/1967 | Gienapp | 128—218 |

OTHER REFERENCES

A.C.M.I. Catalogue, 1952, pp. 161, 163 relied on.

DALTON L. TRULUCK, *Primary Examiner.*